US 12,395,640 B2

(12) United States Patent
Lai et al.

(10) Patent No.: US 12,395,640 B2
(45) Date of Patent: Aug. 19, 2025

(54) METHOD AND APPARATUS FOR HARDWARE-FRIENDLY RATE-DISTORTION OPTIMIZED QUANTIZATION IN VIDEO CODING

(71) Applicant: MEDIATEK INC., Hsinchu (TW)

(72) Inventors: Chen-Yen Lai, Hsinchu (TW);
Tzu-Der Chuang, Hsinchu (TW);
Ching-Yeh Chen, Hsinchu (TW);
Chun-Chia Chen, Hsinchu (TW);
Chih-Wei Hsu, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 549 days.

(21) Appl. No.: 17/714,527

(22) Filed: Apr. 6, 2022

(65) Prior Publication Data

US 2023/0328256 A1    Oct. 12, 2023

(51) Int. Cl.
*H04N 19/147*   (2014.01)
*H04N 19/105*   (2014.01)
*H04N 19/176*   (2014.01)
*H04N 19/18*    (2014.01)
(Continued)

(52) U.S. Cl.
CPC ......... *H04N 19/147* (2014.11); *H04N 19/105* (2014.11); *H04N 19/176* (2014.11); *H04N 19/18* (2014.11); *H04N 19/46* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 10,205,945 B2* | 2/2019 | Nguyen | H04N 19/132 |
| 10,412,396 B2 | 9/2019 | He et al. | |
| 11,095,896 B2 | 8/2021 | Rusanovskyy et al. | |

(Continued)

FOREIGN PATENT DOCUMENTS

| | | |
|---|---|---|
| CN | 108259900 A | 7/2018 |
| CN | 111194551 A | 5/2020 |

OTHER PUBLICATIONS

Chinese language office action dated Dec. 9, 2022, issued in application No. TW 111119856.

*Primary Examiner* — Kaitlin A Retallick
(74) *Attorney, Agent, or Firm* — McClure, Qualey & Rodack, LLP

(57) ABSTRACT

Methods and apparatus for video coding system utilizing Rate-Distortion Optimized Quantization (RDOQ) are provided. According to one method, a rate for a level belonging to a level set of a current quantized transform coefficient is estimated for a current coefficient group (CG) based on neighboring quantized coefficients of the current quantized transform coefficient and the current CG. A best level for the current quantized transform coefficient is selected from the level set for a best RD-cost. In another method, a TB is partitioned into M regions and M best regions are derived for the M regions according to RDOQ. At least two alternative region RD-costs are generated for each of the M best regions based on a relative position between each of the M best regions and a last significant region in the TB. TB RD-cost for the TB is selected according a last non-zero best region position.

11 Claims, 11 Drawing Sheets

(51) Int. Cl.
*H04N 19/46* (2014.01)
*H04N 19/70* (2014.01)

(56) References Cited

U.S. PATENT DOCUMENTS

| | | | |
|---|---|---|---|
| 2013/0128985 A1* | 5/2013 | He | H04N 19/63 375/240.18 |
| 2013/0188725 A1* | 7/2013 | Wang | A61K 36/185 375/240.18 |
| 2019/0116361 A1* | 4/2019 | Rusanovskyy | H04N 19/198 |

* cited by examiner

METHOD AND APPARATUS FOR HARDWARE-FRIENDLY RATE-DISTORTION OPTIMIZED QUANTIZATION IN VIDEO CODING

FIELD OF THE INVENTION

The present invention relates to video coding system. In particular, the present invention relates to rate-distortion optimized quantization for transform coefficients that is specially designed for hardware friendly implementation.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1 provides an example of simplified system block diagram of the VVC encoding system, where the blocks within the dashed box 150 corresponds to main blocks for a corresponding decoder. The input video signal is predicted by the predicted signal (136), which is derived using Inter prediction, Intra prediction or Combined intra/inter prediction (110). The prediction residual signal is derived as the difference between the input signal and the predicted signal 136 using adder 116. The prediction residual signal is then processed by transformation (118). The transform coefficients from transform 118 are quantized by quantizer 120 and entropy coded using entropy encoder 122. Other side information and related coding parameters may also be entropy coded and included in the bitstream. The reconstruction block 128 adds the prediction signal and the reconstructed residual signal from inverse transform (126), where the inverse transform 126 receives de-quantized transform coefficients from de-quantizer 124. The reconstructed signal from the reconstruction block 128 is further processed by loop filters 130 in order to reduce coding artifacts. The decoded pictures are stored in the frame buffer (134) for predicting the future pictures in the input video signal. On the decoder side, the reference pictures may be provided as output pictures. The prediction block 110 operates differently at the encoder side and the decoder side. At the encoder side, the block will perform motion estimation for Inter prediction or select an Intra prediction mode that achieves the best coding performance. On the decoder side, the block will perform motion compensation for Inter prediction or Intra prediction using the mode determined the encoder.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. For example, affine motion estimation is adopted by the VVC standard. The affine motion estimation and ALF are briefly reviewed as follows.

Rate-Distortion Optimized Quantization (RDOQ)

In video test model for VVC (Adrian Browne, et al., "Algorithm description for Versatile Video Coding and Test Model 14 (VTM 14)", Joint Video Experts Team (JVET) of ITU-T SG 16 WP 3 and ISO/IEC JTC 1/SC 29, 23rd Meeting, by teleconference, 7-16 Jul. 2021, Document: JVET-W2002-v1), Rate-Distortion Optimized Quantization (RDOQ) is applied to the transform coefficients. According to RDOQ, a transform coefficient is directly quantized to level $l^{ceil}$. The directly quantized transform coefficient is then adjusted to an optimized level or a best level ($l^{best}$). The best level ($l^{best}$) is determined based on RD-cost as follows:

If $l^{ceil}=0$, best level=0     (1)

If $l^{ceil}=1$, best level=0 or 1     (2)

If $l^{ceil}=2$, best level=0, 1 or 2     (3)

If $l^{ceil}>2$, best level=$l^{ceil}$ or $l^{ceil}-1$     (4)

For example, when $l^{ceil}>2$, the best level ($l^{best}$) is selected between $l^{ceil}$ and $l^{ceil}-1$ depending on which one can achieve a better RD performance (i.e., lower RD cost). According to VTM, the rate of the current coefficient is estimated based on 5 neighboring final quantized levels. The final quantized level is defined as the RDOQ processed coefficients. The locations of the 5 neighboring final quantized levels are shown in FIG. 2, where location 210 corresponds to the current coefficient and the 5 locations marked with "X" correspond to the 5 neighboring final quantized levels for estimating the bit rate of the current coefficients. As shown in FIG. 2, the 5 neighboring quantized coefficients consist of two right-side neighboring quantized coefficients, one lower-right neighboring quantized coefficient and two bottom-side neighboring quantized coefficients. The bit rate estimation comprises calculating the summation of the 5 neighboring final quantized levels and counting the number of non-zero levels for context selection. Therefore, the RDOQ presents a challenge to hardware (HW) implementation since the transform coefficients in one transform block (TB) cannot be processed in parallel at the same time due to the data dependency. When sign data hiding (SDH) is applied, the critical path gets even worse.

Data dependency also occurs for the rate estimation of coefficient group (CG) significant-flag. According to VTM, the rate for the current CG significant flag is estimated based on two neighboring CGs (one to the right and one at the bottom) as shown in FIG. 3, where CG 310 is the current CG, CG 320 is the right CG and CG 330 is the bottom CG. The current CG significant-flag estimation references to the significant flags of the right CG and the bottom CG to determine the corresponding context for rate estimation. The CG significant flag is based on the final quantized coefficients in the CG. Again, this presents a challenge to the hardware (HW) implementation since the CGs in one TB cannot be processed in parallel at the same time due to the data dependency.

VTM also supports sign data hiding (SDH) so that 1 bit may be saved. VVC uses the same SDH technique as the previous HEVC (High Efficiency Video Coding) standard. If the difference between the scan indexes of the last and first nonzero level (in coding order) inside a CG is greater than 3, the sign for the last nonzero level of the CG is not coded, instead the sign for the last nonzero level of the CG is derived based on the sum of absolute values. For SDH, odd sums indicate negative values and even sums indicate positive values. When SDH is used with RDOQ, the SDH is processed as follows:

Test $l^{best}-1$, and $l^{best}+1$, if $l^{best}>0$  (5)

Test $l^{best}+1$, if $l^{best}=0$  (6)

As described above, the existing RDOQ process adopted in the VTM prevents parallel processing to handle multiple TBs at the same time due to the data dependency, which will slow down hardware implementation speed. Therefore, it is desirable to develop methods and apparatus to overcome the issue.

BRIEF SUMMARY OF THE INVENTION

A method and apparatus for video coding system that utilizes Hardware-Friendly Rate-Distortion Optimized Quantization (RDOQ) are disclosed. According to one method, transform coefficients associated with a transform block (TB) in a current picture are received. The transform coefficients are quantized into quantized transform coefficients. A first rate for a level belonging to a level set of a current quantized transform coefficient is estimated for a current coefficient group based on one or more neighboring quantized coefficients of the current quantized transform coefficient. A best level for the current quantized transform coefficient is selected from the level set of the current quantized transform coefficient, where the best level achieves a best RD-cost.

In one embodiment, the method further comprises a second rate for a syntax associated with zero or non-zero coefficient group for the current coefficient group based on said one or more neighboring quantized coefficients of the current quantized transform coefficient and the current coefficient group.

In one embodiment, the level set of the current quantized transform coefficient consists of 0 if the current quantized transform coefficient is equal to 0; the level set of the current quantized transform coefficient consists of 0 and 1 if the current quantized transform coefficient is equal to 1; the level set of the current quantized transform coefficient consists of 0, 1 and 2 if the current quantized transform coefficient is equal to 2; and the level set of the current quantized transform coefficient consists of the current quantized transform coefficient and (the current quantized transform coefficient—1) if the current quantized transform coefficient is greater than 2.

In one embodiment, the level set of the current quantized transform coefficient consists of 0 if the current quantized transform coefficient is equal to 0; and the level set of the current quantized transform coefficient consists of the current quantized transform coefficient and (the current quantized transform coefficient—1) if the current quantized transform coefficient is greater than 0. In one embodiment, said one or more neighboring quantized coefficients of the current coefficient group consist of the quantized coefficients in right-side neighboring coefficient group, and the quantized coefficients in bottom-side neighboring coefficient group.

In one embodiment, the neighboring quantized coefficients of the current quantized transform coefficient consist of two right-side neighboring quantized coefficients, one lower-right neighboring quantized coefficient and two bottom-side neighboring quantized coefficients. In one embodiment, the summation of the neighboring quantized coefficients and the number of non-zero quantized coefficients of the neighboring quantized coefficients are used to estimate the rate for the level belonging to the level set of the current quantized transform coefficient.

In one embodiment, when sign data hiding (SDH) is used to save one bit for sign data of the transform coefficients in one coefficient group of the TB and a parity of a sum of best levels in one coefficient group fails to satisfy SDH assumption, SDH process checks all levels in the level set of a target quantized transform coefficient except for the level equal to best level.

In another method, transform coefficients associated with a transform block (TB) in a current picture are received, where TB is partitioned into M regions and M is an integer greater than 1. M best regions are derived for the M regions individually by quantizing the transform coefficients in each of the M regions into quantized transform coefficients and determining a best level for each quantized transform coefficient in each of the M regions to achieve a best region RD-cost for each of the M regions. There are N best regions containing at least one non-zero best level and N is greater than or equal to 1 and smaller than or equal to M. At least two alternative region RD-costs are generated for each of the M best regions, and the at least two alternative region RD-costs for each of the M best regions are related to a relative position between each of the M best regions and a last significant region in the TB. The last significant region is a last non-zero region. A TB RD-cost is selected according a last non-zero best region position. The TB RD-cost corresponds to a sum of target region RD-costs for the M best regions in the TB and one target region RD-cost is selected from the at least two alternative region RD-costs for each of the M best regions according the relative position between said each of the M best regions and the last significant region in the TB. In one embodiment, the M regions correspond to M coefficient groups (CGs).

In one embodiment, said at least two alternative region RD-costs consist of three alternative RD-costs corresponding to each of the M best regions being before the last significant region, each of the M best regions being after the last significant region, and each of the M best regions being the last significant region respectively.

In one embodiment, each of the M best regions is assigned to a diagonal group according to a diagonal scan pattern; the TB RD-cost is calculated by processing a column of the M best regions each time from a rightmost column to a leftmost column; and the target region RD-costs for a current column of the M best regions are accumulated to corresponding diagonal groups. In one embodiment, a very first non-zero best region along a diagonal scan pattern from a lowest frequency to high frequency is selected as a final last significant region.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned earlier, the RDOQ process for a current coefficient relies on 5 neighboring final quantized coefficients. The final quantized coefficients are the final adjusted transform coefficients that are quantized to directly quantized levels and the directly quantized levels are then adjusted to achieve the best RD performance. The 5 neighboring final quantized coefficients are used as a context to estimate the bit rate for the current coefficient. Each of the neighboring final quantized coefficients may further rely on its neighboring final quantized coefficients during the RDOQ process. Therefore, the RDOQ process has to be performed sequentially according to the existing VTM.

In order to overcome this data dependency issue, the present invention discloses a RDOQ scheme to use directly quantized neighboring coefficients for bit rate estimation. In other words, during the RDOQ process, the 5 neighboring final quantized coefficients according to the existing VTM are replaced by 5 neighboring directly quantized coefficients according to the present invention.

In order to solve the data dependency issue for CG significant flag estimation, the present invention discloses a scheme to use directly quantized coefficients to derive the CG significant flags for the right CG and the bottom CG. According to the present invention, the CG significant flag for the right CG is set to 1 if the sum of the absolute values of all directly quantized coefficients within the right CG is greater than or equal to 4. Similarly, the CG significant flag for the bottom CG is set to 1 if the sum of the absolute values of all directly quantized coefficients within the bottom CG is greater than or equal to 4.

The use of directly quantized coefficients for bit estimation will remove the data dependency issue so that all transform coefficients and CGs within a TB can be processed in parallel during the RDOQ process.

Figure 1:
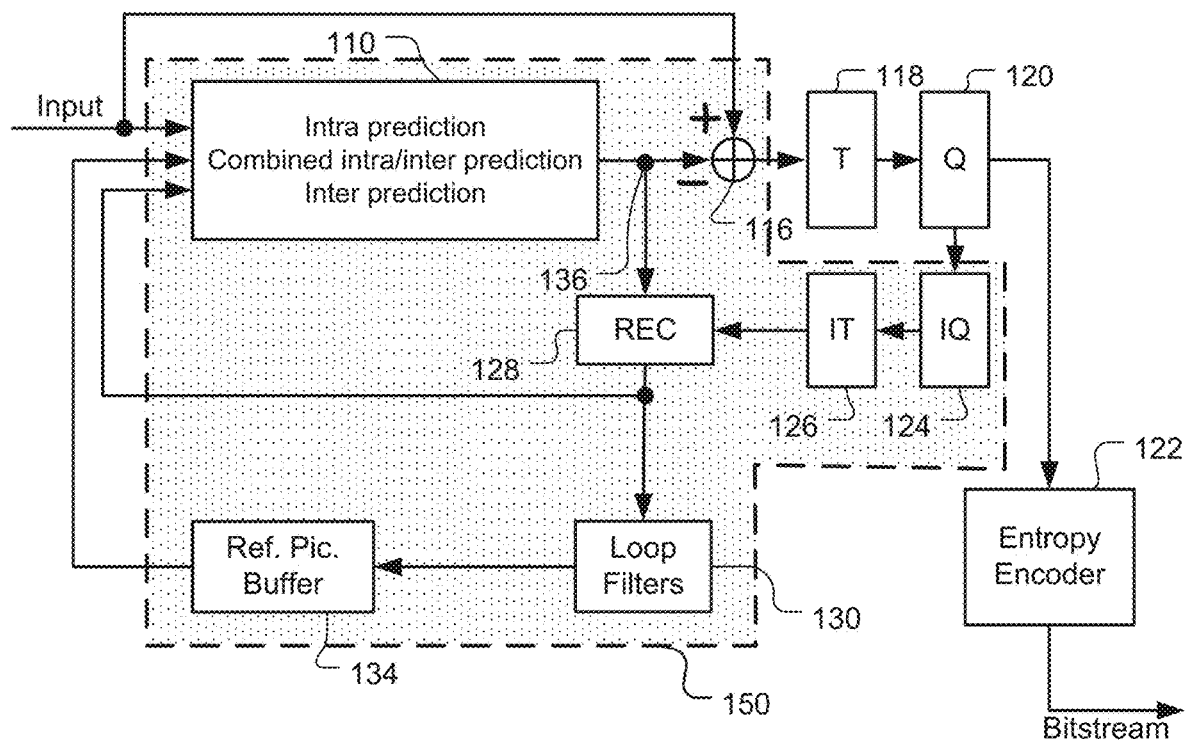
FIG. 1 illustrates an exemplary adaptive inter/intra video coding system.
Figure 2:
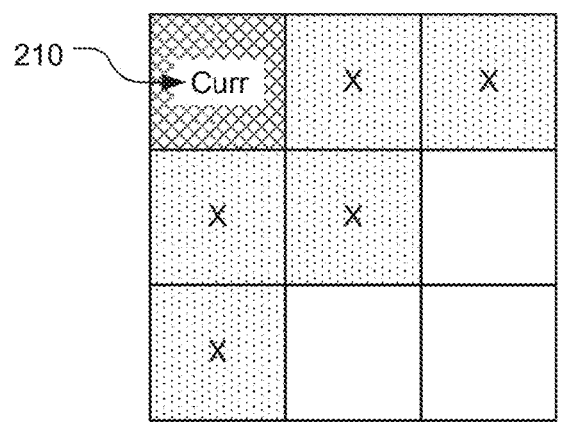
FIG. 2 illustrates an example of 5 neighboring final quantized levels used for estimating the bit rate of the current coefficients.
Figure 3:
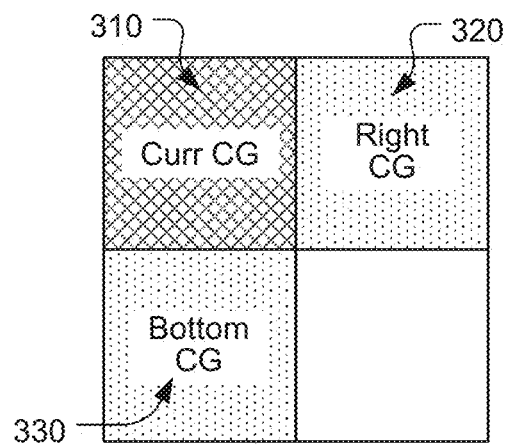
FIG. 3 illustrates an example of rate estimation for the current CG significant flag based on two neighboring CGs (one to the right and one at the bottom).
Figure 4:
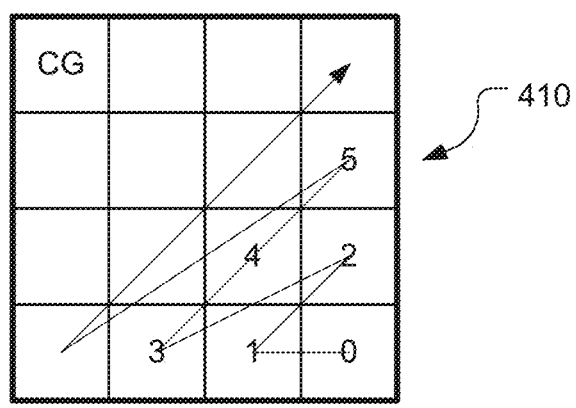
FIG. 4 illustrates an example of coefficient scanning through the CGs in a TB, where each small square (CG 0, CG 1, CG 2, etc.) corresponds to one CG.

In the first scan pass, the diagonal scan order is applied to loop each CG in one TB (from high frequency to low frequency). For each CG, the distortion and rate are summed up one by one. The rate-distortion cost is compared with all-zero CG cost. If the all-zero CG cost wins, the CG will be set to all zero. In the second scan pass, the last significant position is found by scanning all coefficients again from the high frequency to the low frequency region in one TB. N kinds of TB cost will be calculated by assuming each non-zero coefficient position to be the potential last position, where N is the number of non-zero coefficients after the first pass. In the final stage, the position with the minimum TB RD-cost is regarded as the last significant level position. FIG. 4 illustrates an example of coefficient scanning through the CGs is a TB 410, where each small square (CG 0, CG 1, CG 2, etc.) corresponds to one CG. As shown in FIG. 4, the TB is partitioned into M CGs, where M is equal to 16 in this example. While the TB is partitioned into multiple CGs in the following illustration, the TB can be partitioned into multiple region according to the present invention, where the region can be other sizes (i.e., non 4×4).

Figure 5:
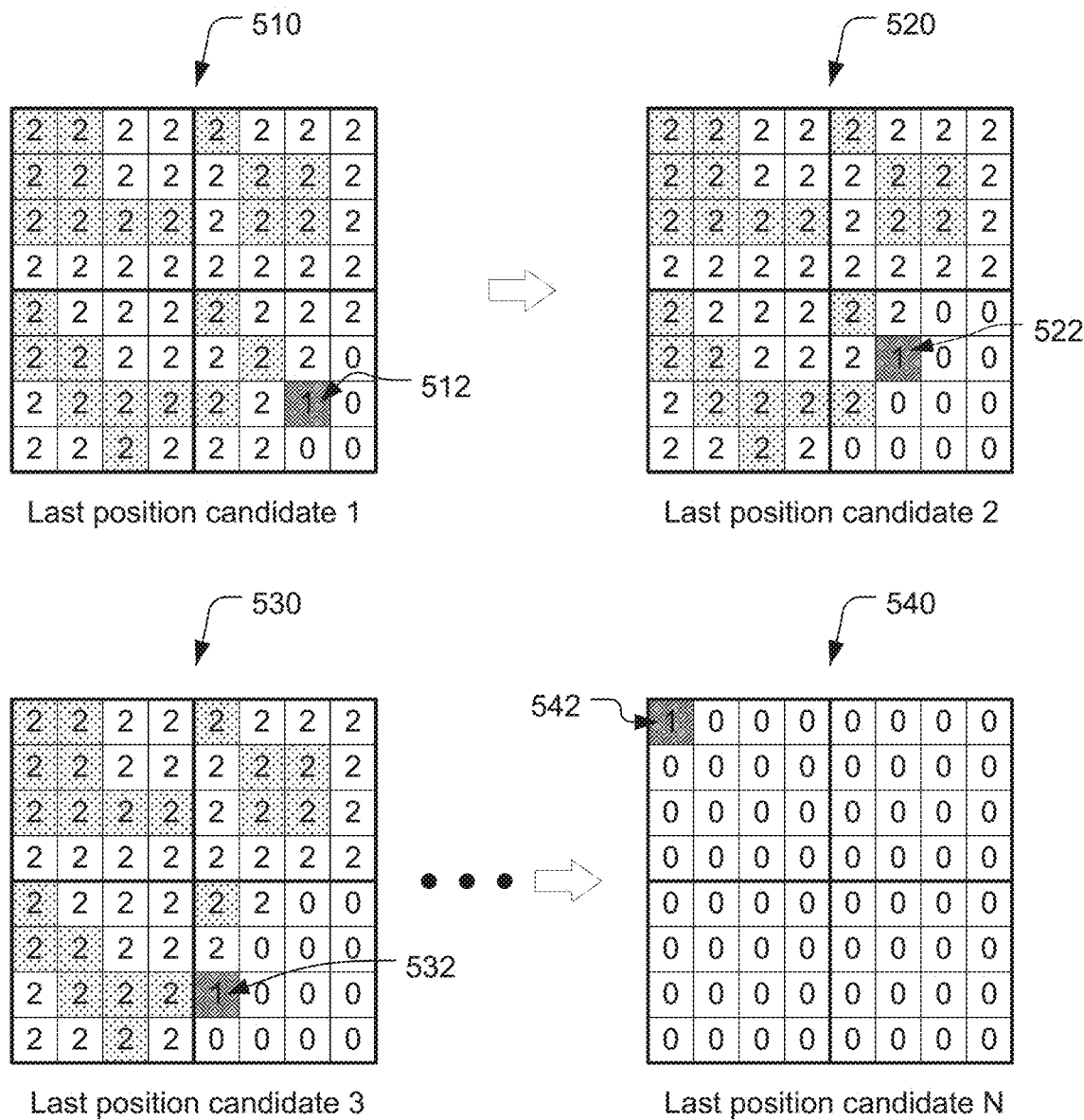
FIG. 5 illustrates an example of cost calculation for N kinds of RD-cost of a TB, where the TB consists of 8×8 coefficients with each coefficient represented as a small square, and the TB is divided into 4 CGs with each CG consisting of 4×4 coefficients.

According to the existing VTM, we need to calculate N kinds of RD cost to find the optimal last significant level position in the second pass. We also need to buffer the rate and distortion information for all samples until the last significant level is found. FIG. 5 illustrates an example of cost calculation for N kinds of RD-cost of a TB, where the TB consists of 8×8 coefficients with each coefficient represented as a small square, and the TB is divided into 4 CGs with each CG consisting of 4×4 coefficients. Block 510 illustrates the RD-cost calculation for the last coefficient position candidate 1, which consists of the selected best level after first scan pass and includes initial last significant position, where the last position 512 is indicated by "1". The squares with "0" correspond positions prior to the last position 512 (in the scan order) and the squares with "2" correspond positions after the last position 512 (in the scan order). Furthermore, each square with white background corresponds to a zero coefficient and each square filled with dots corresponds to a non-zero coefficient. After the RD-cost for the last coefficient position candidate 1 is calculated, the RD-cost calculation for the last coefficient position candidate 2 (522) is shown in block 520. The RD-cost calculation for the last coefficient position candidate 3 (532) is shown in block 530. The RD-cost calculation continues and the RD-cost calculation for the last coefficient position candidate N (542) is shown in block 540.

According to the existing VTM, the RD-cost is calculated for all N last coefficient position candidates. A smallest RD-cost is selected among the N candidates. The computational load is heavy. Accordingly, the present invention also discloses a method to reduce the computational complexity for determining the smallest RD-cost among the N candidates. The present invention uses initial last position from pass 1 (i.e., the last coefficient candidate 1) as final last position (without changing any non-zero sample to zero). Therefore, there is no need to calculate N kinds of RD-costs according to the present invention. The best level decisions of all transform coefficients within one CG are then made, where the CGs are processed according to the scan pattern in the first scan pass. We accumulate 3 kinds of distortions and rates respectively as follows:

Type-1 CG: The CG is the last significant CG within a TB
Type-0 CG: The CG is encoded before the last significant CG
Type-2 CG: The CG is encoded after the last significant CG.

Figure 6:
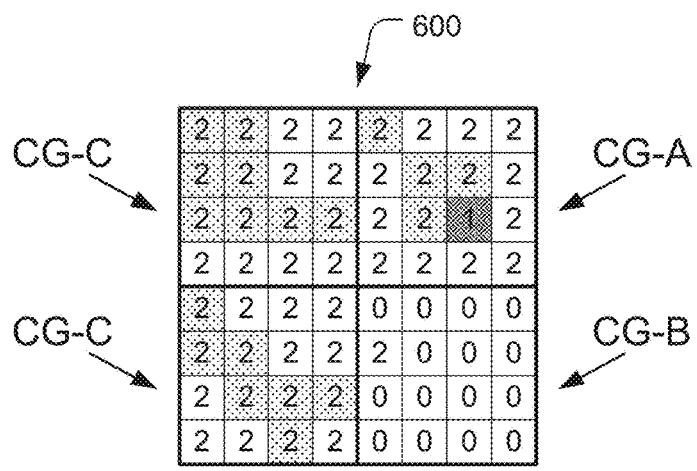
FIG. 6 illustrates an example of 3 kinds of CG distortions and rates according to the present invention, where the TB is divided into 4 CGs and each CG consists of 4×4 coefficients.

FIG. 6 illustrates an example of 3 kinds of CG distortions and rates according to the present invention. TB 600 is divided into 4 CGs, where each CG consists of 4×4 coefficients. In FIG. 6, CG-A (i.e., Type-1 CG) at the upper right of the TB contains the last coefficient as indicated by a dot-filled square "1". CG-B (i.e., Type-0 CG) at the lower right of the TB is processed before CG-A. The two CG-C's (i.e., Type-2 CGs) on the left side of the TB are processed after CG-A.

Figure 7:
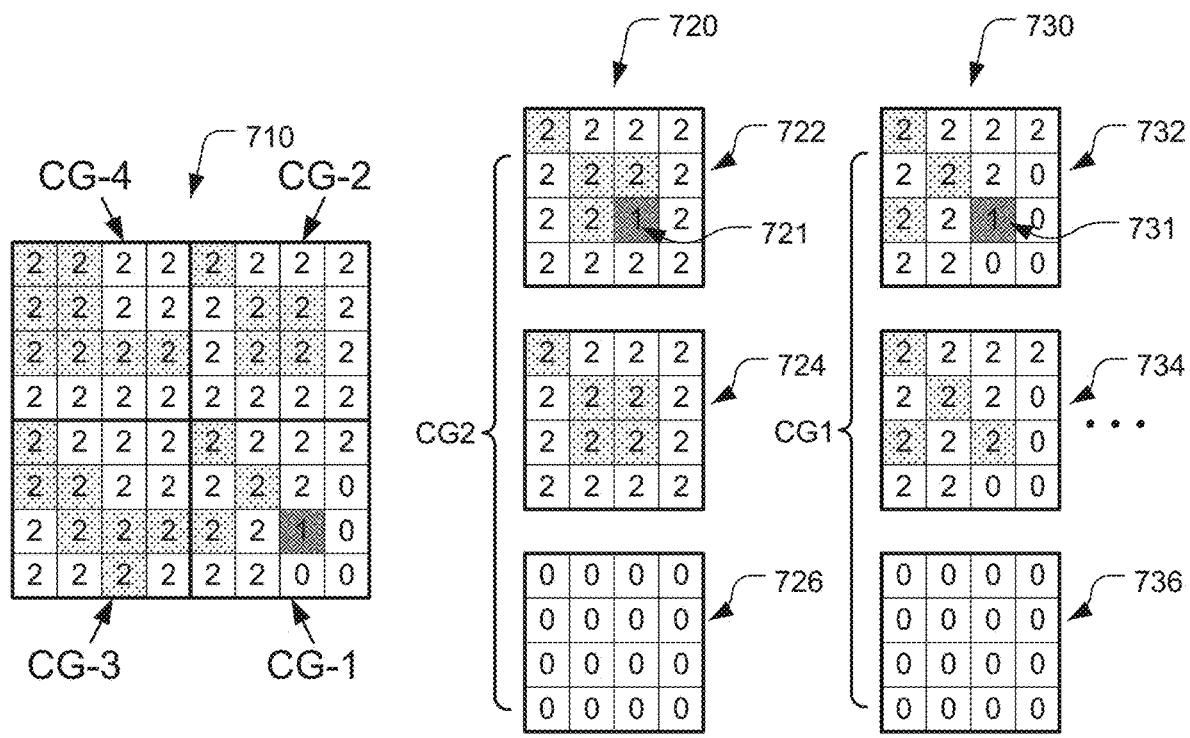
FIG. 7 illustrates an example of the simplified process according to an embodiment of the present invention, where the result of the initial last significant CG position from pass 1 is used as the final last position and 3 kinds of RD-costs are calculated for each CG.

The present invention is illustrated by applying the simplified process to the example in FIG. 5. The present invention uses the result of the initial last significant coefficient position from pass 1 (i.e., CG-1) as the final last position as shown in block 710 in FIG. 7. Then, for each CG in the TB, we calculate 3 kinds of RD-costs. The first kind of RD-cost corresponds to the CG containing the last significant coefficient; the second kind of RD-cost corresponds to the CG not containing the last significant coefficient; and the third kind of RD-cost corresponds to the CG containing all-zero coefficients. Therefore, for CG-2, the 3 kinds of RD-costs 720 are shown in blocks 722, 724 and 726 respectively, where the position of the last significant position 721 is indicated by a dot-filled square "1". For CG-1, the 3 kinds of RD-costs 730 are shown in blocks 732, 734 and 736 respectively, where the position of the last significant position 731 is indicated by a dot-filled square "1". Similarly, the 3 kinds of RD-costs are calculated for CG-3 and CG-4.

After the 3 kinds of RD-costs are determined for all CGs, we can determine which combination of CGs RD-costs will lead to the minimum RD-cost for the TB. For example, one candidate corresponds to CG-1 containing the last significant coefficient and CG-2 to CG-4 are coded after the last significant CG (i.e., CG-1); another candidate corresponds to CG-2 containing the last significant coefficient, CG-1 is coded before the last significant CG (i.e., CG-2) and CG-3 and CG-4 are coded after the last significant CG, and so on. Therefore, computational complexity is greatly reduced according to the present invention.

According to the present invention, the RD-cost associated with each non-zero CG is checked for a candidate of last significant CG. If there are N non-zero CGs, N RD-costs are calculated for the N candidates in the first pass. After the last significant position is determined in the first pass, the total RD-cost of the CGs are calculated with the candidate CG as the last significant CG (i.e., Type-1 CG), all CG before this candidate (i.e., Type-0 CG) and all CGs after this candidate (i.e., Type-2 CG). While the RDOQ according to the present invention is much efficient than the convention RDOQ, however it still involves lots of computations and requires lots of temporary storage. Accordingly, a method to further reduce the computational complexity as well as the temporary storage for RDOQ is disclosed.

Figures 8A, 8B:
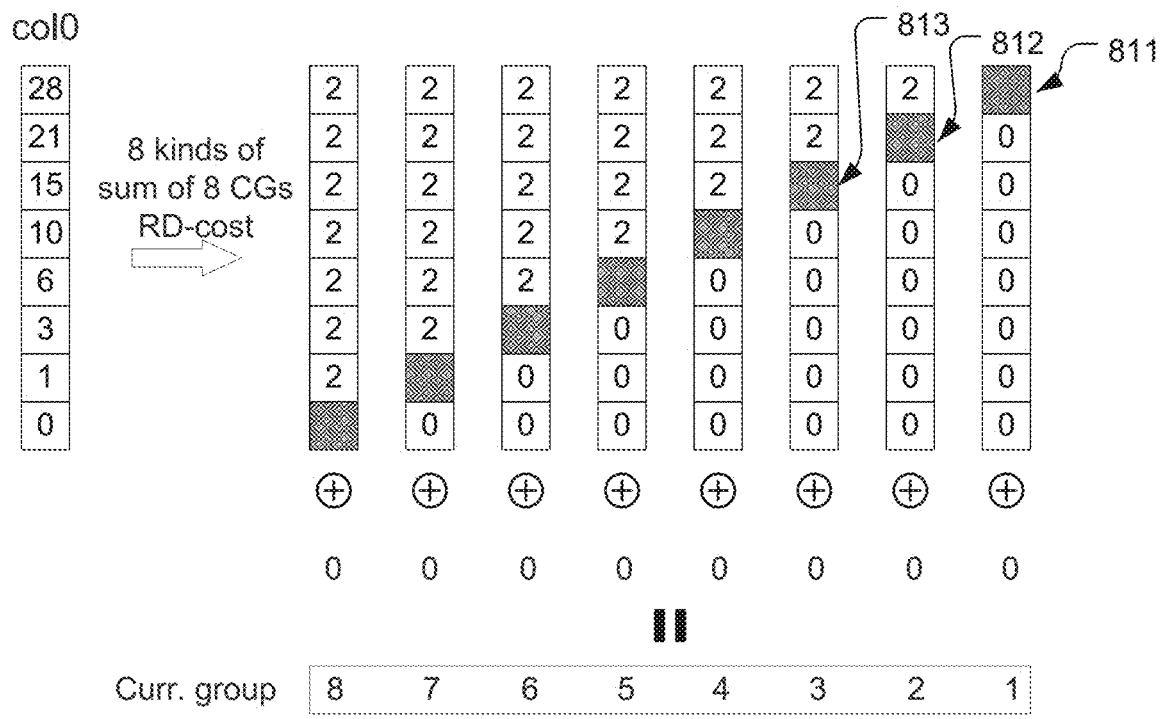
FIG. 8A illustrates an example of diagonal CG groups, where the TB consists of 32×32 coefficients and there are 8 CGs in the width direction and 8 CGs in the height direction.
FIG. 8B illustrates an example of processing the CGs in the TB column by column from column 0 (col0) to column 7 (col7), where col0 is being processed and 8 kinds of RD-costs are calculated for each of the 8 CGs in col0 being a last significant CG candidate respectively.

According to this method, the RD-cost calculation is performed on each CG column of the TB. The processing is performed from the rightmost CG column to the leftmost CG column. The CGs in the TB are assigned to diagonal groups according to a diagonal scan pattern. After one CG column is done, we accumulate the distortion and rate of each CG to the corresponding diagonal group. The number of accumulated groups is equal to the number of CG in TB height and CGs in the same diagonal line are regarded as the same group. FIG. 8A illustrates an example of diagonal CG groups, where the TB consists of 32×32 coefficients and there are 8 CGs in the width direction and 8 CGs in the height direction. Accordingly, there are 8 CG groups, where CG0 belongs to CG groups 8, CG2 and CG1 belong to CG groups 7, CG5, CG4 and CG3 belong to CG groups 6, and so on.

According to the present invention, the CGs in the TB are processed column by column from column 0 (col0) to column 7 (col7). Every group assumes that the last significant CG is the CG at a corresponding location as shown in FIG. 8B. For example, while processing col0 CGs, CG 28 is treated as the last significant CG 811 (i.e., Type-A CG) in group1, CG 21 is treated as the last significant CG 812 (i.e., Type-A CG) in group2, CG 15 is treated as the last significant CG 813 (i.e., Type-A CG) in group3, and so on. When CG 28 is considered as the last significant CG, CGs 21, 15, 10, 6, 3, 1 and 0 are Type-B CG (i.e., before the last significant CG). When CG 21 is considered as the last significant CG, CG 28 is Type-C CG (i.e., after the significant CG), and CGs 15, 10, 6, 3, 1 and 0 are Type-A CG (i.e., before the last significant CG). When CG 15 is considered as the last significant CG, CGs 28 and 21 are Type-C CG (i.e., after the significant CG), and CGs 10, 6, 3, 1 and 0 are Type-A CG (i.e., before the last significant CG). Each of the 8 kinds of RD-costs corresponds to a CG in the CG column being the last significant CG and the RD-cost for each group is calculated accordingly.

Figures 9A, 9B:
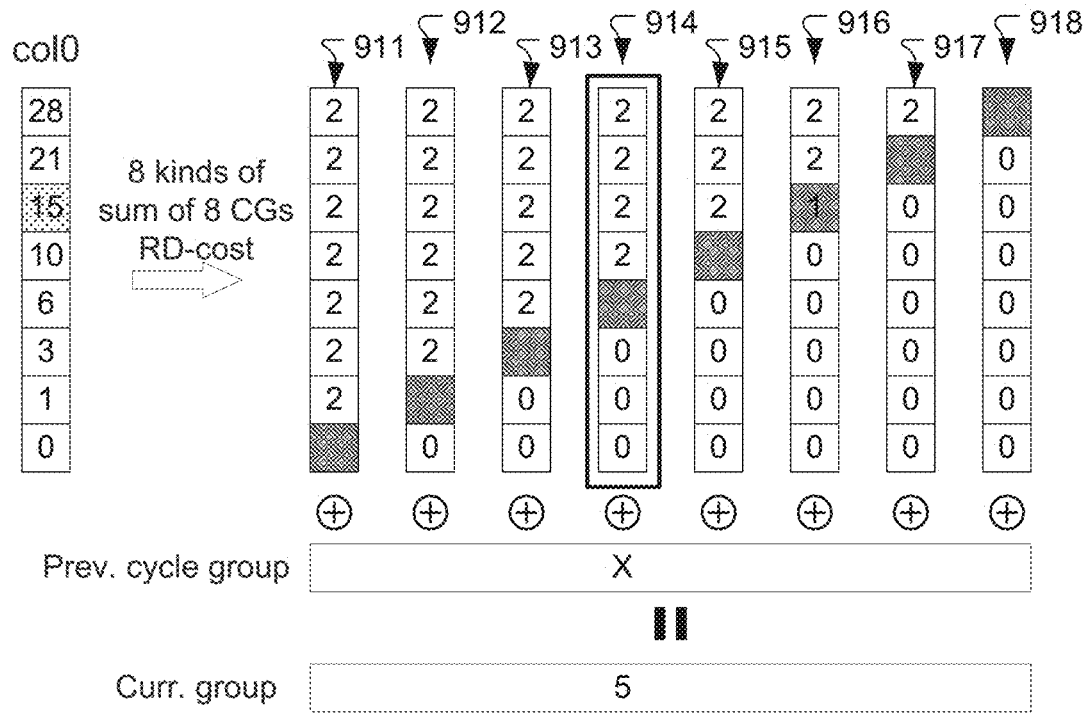
FIG. 9A illustrates an example of 64 CGs in a TB with non-zero CGs (i.e., CGs 7, 8, 15, 32, 51, 55, 56, and 58-63) as indicated by dots-filled squares, where the RD-cost for the TB is accumulated from col0 to col7.
FIGS. 9B-G illustrate an example of various stages during the RD-cost calculation by accumulating the CG columns from col0 to col7 according to an embodiment of the present invention.

The RD-cost computation according to an embodiment of the present invention is illustrated in FIGS. 9A-G, where FIG. 9A illustrates an example of 64 CGs in a TB with non-zero CGs (i.e., CGs 7, 8, 15, 32, 51, 55, 56, and 58-63) indicated by dots-filled squares. The RD-cost is calculated by accumulating the RD-cost of CG columns from right to left (i.e., col0 to col7).

FIG. 9B illustrates an example of calculating the RD-cost for col0 CGs according to the present invention. Eight kinds of sum of RD-cost (911-918) for the col0 CGs are calculated by assuming each of the col0 CGs is a candidate of the last significant CG. For example, the first kind RD-cost 911 assumes CG 0 being the candidate for the last significant CG and CGs 1, 3, 6, 10, 15, 21 and 28 are considered as after-the-last-significant CGs. The first kind RD-cost 911 can be calculated for the 8 CGs with CG 0 as an all zero CG and the remaining CGs as after-the-last-significant CGs. On the other hand, the eighth kind RD-cost 918 can be calculated for the 8 CGs with CG 28 as an all zero CG and the remaining CGs (i.e., CGs 0, 1, 3, 6, 10, 15 and 21) as before-the-last-significant CGs. The 8 kinds of RD-cost are added to previous group cost (i.e., 0 for col0) and the results are stored in corresponding locations of the current group RD-cost. For example, the fourth kind RD-cost 914 is stored at current group 5 location since CG 6 is the candidate, which belongs to group 5 as shown in FIG. 9A and FIG. 9B.

Figure 9C:
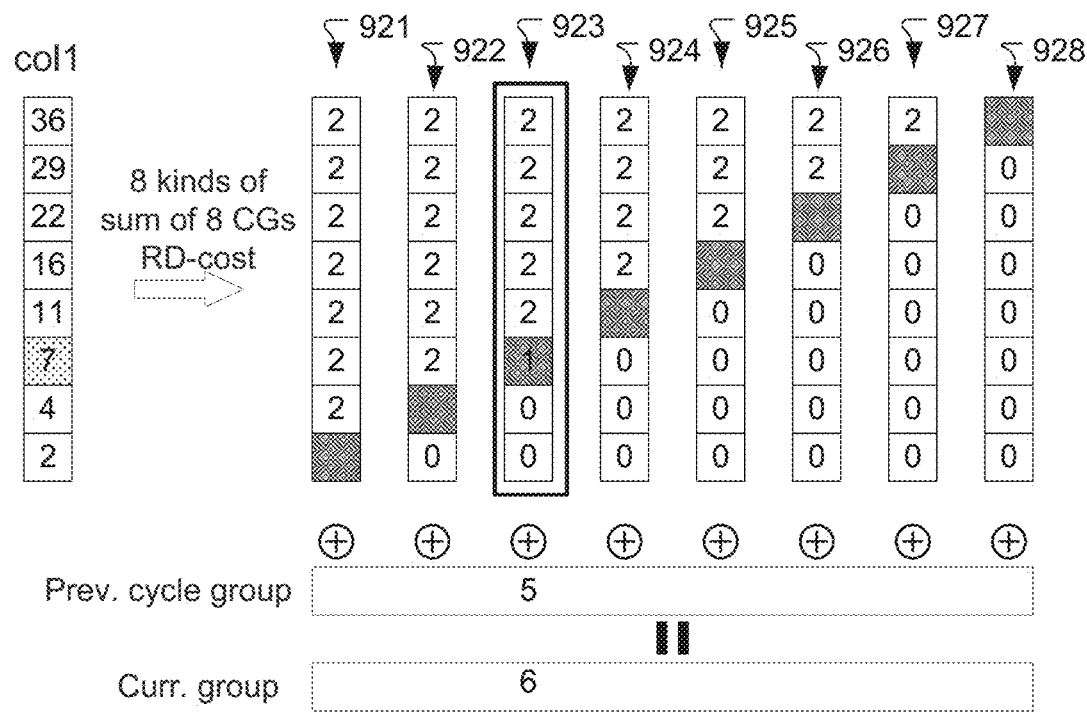

After col0 is processed, the RD-cost calculation moves to the second column (i.e., col1) as shown in FIG. 9C. Eight kinds of sum of RD-cost (921-928) for the col1 CGs correspond to the eight candidates of the last significant CG from the bottom to the top of col1 CGs. For example, the third kind RD-cost 923 corresponds to the non-zero CG 7 being the candidate. In this example, CG 7 is also the real last significant CG. Therefore, the RD-cost for this column is calculated for CG 7 being the last significant CG, CGs 2 and 4 being before-the-last-significant CGs and CGs 11, 16, 22, 29 and 36 being after-the-last-significant CGs. This third kind RD-cost 923 is added to the previous fourth kind RD-cost 914 (stored in group 5 location) and the result is stored in current group location 6 as shown in FIG. 9C.

Figure 9D:
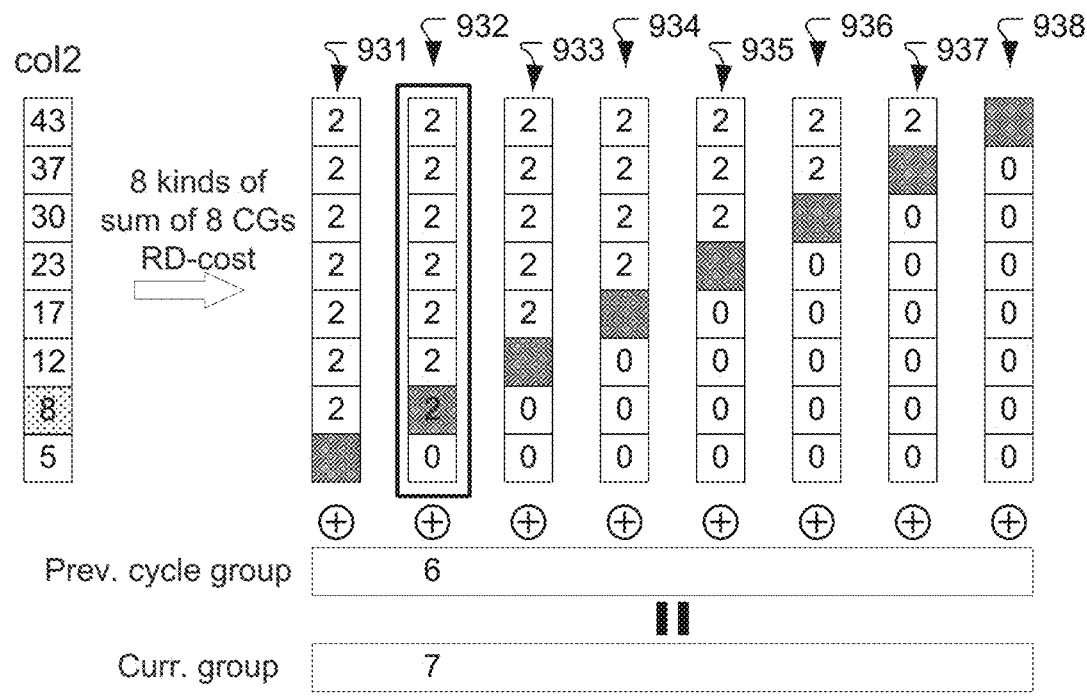

After col1 is processed, the RD-cost calculation moves to the third column (i.e., col2) as shown in FIG. 9D. Among the eight kinds of sum of RD-cost (931-938) for the col2 CGs, the second kind RD-cost 932 is calculated and added to the accumulated RD-cost at previous group location 6 and the result is stored at current group location 7.

Figure 9E:
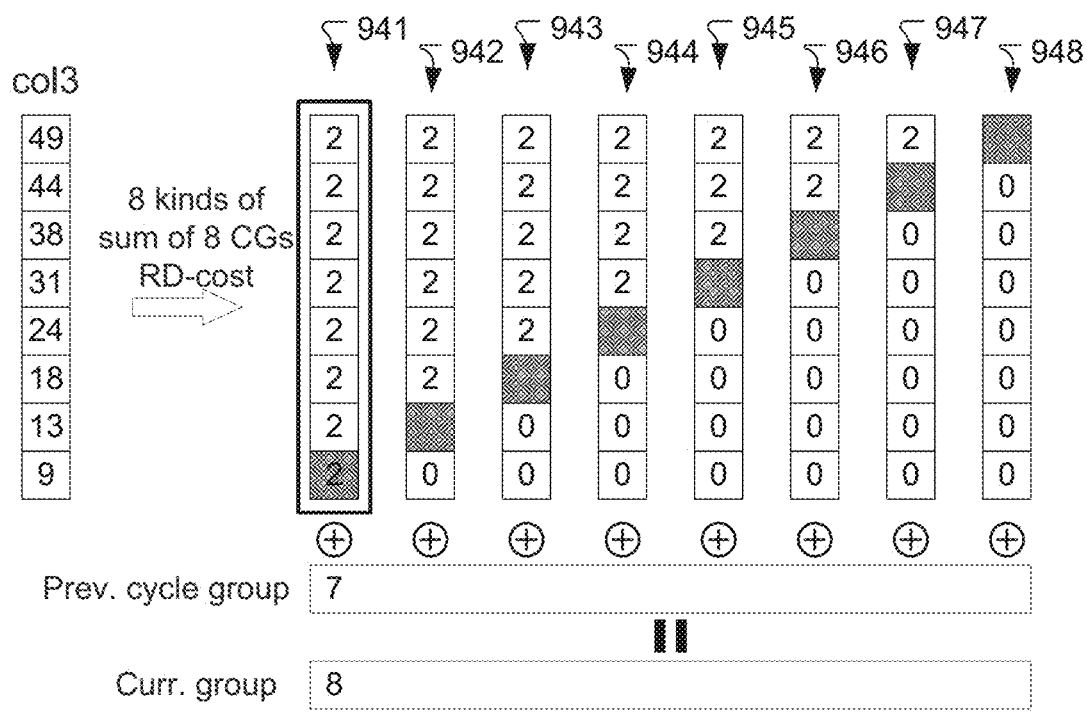

After col2 is processed, the RD-cost calculation moves to the fourth column (i.e., col3) as shown in FIG. 9E. Among the eight kinds of sum of RD-cost (941-948) for the col3 CGs, the first kind RD-cost 941 is calculated and added to the accumulated RD-cost at previous group location 7 and the result is stored at current group location 8.

Figure 9F:
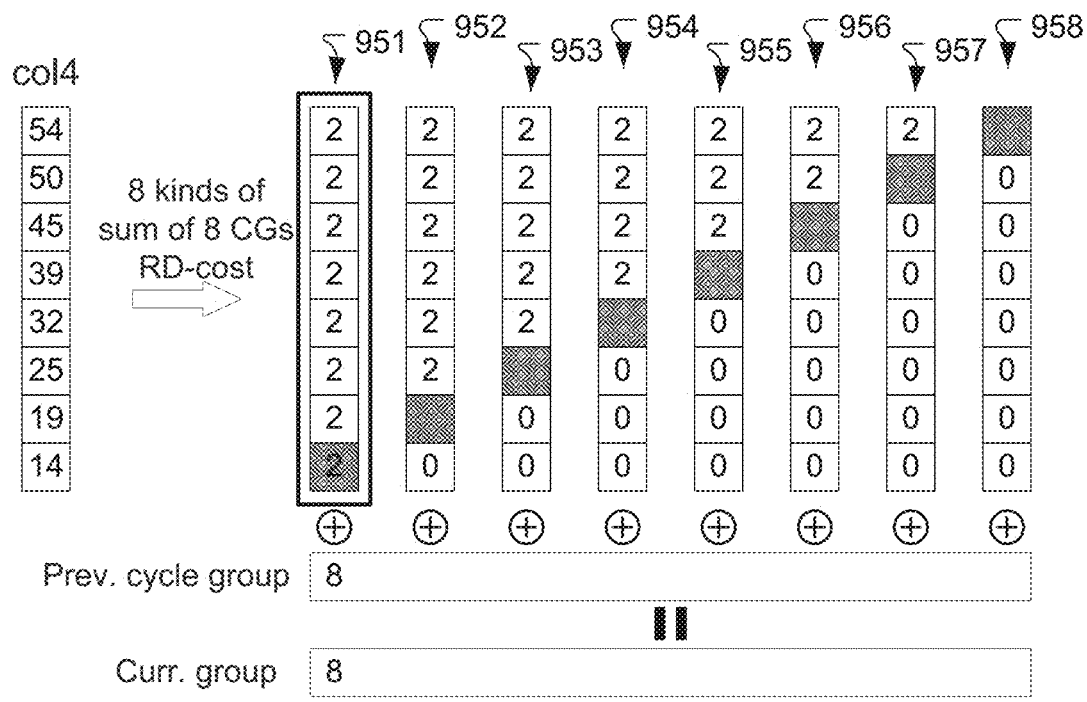

After col3 is processed, the RD-cost calculation moves to the fifth column (i.e., col4) as shown in FIG. 9F. Among the eight kinds of sum of RD-cost (951-958) for the col4 CGs, the first kind RD-cost 951 is calculated and added to the accumulated RD-cost at previous group location 8 and the result is stored at current group location 8. From col4 and beyond, all the CGs are the after-the-last-significant CG and the first kind RD-cost is calculated and added to the accumulated RD-cost at previous group location 8.

Figure 9G:
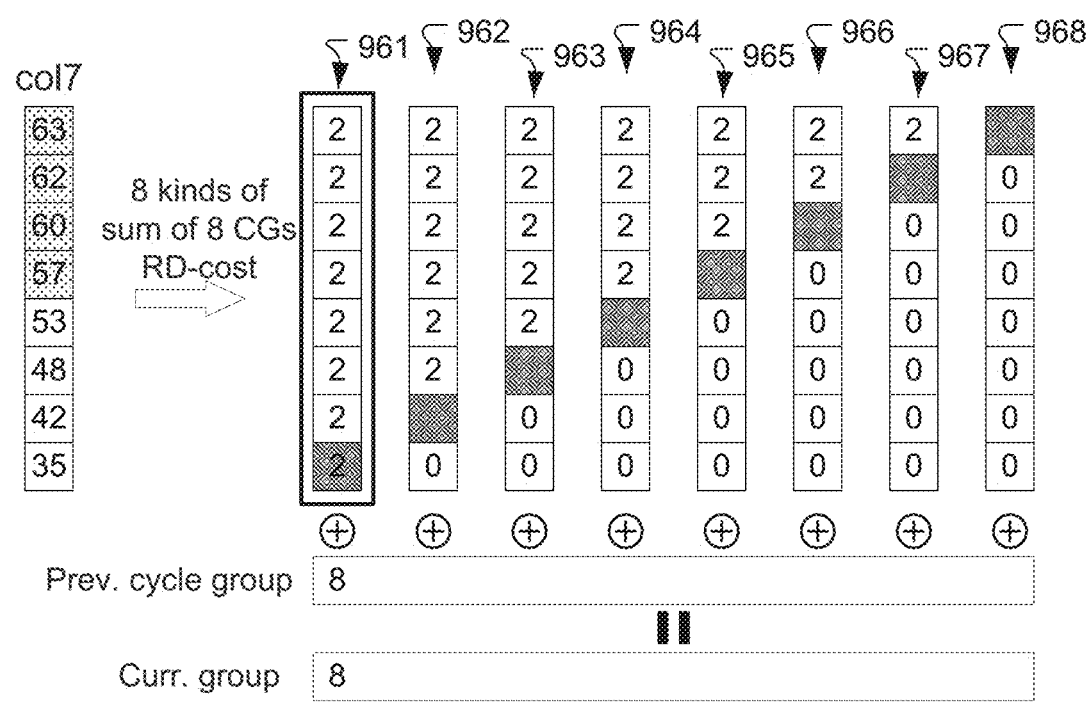

FIG. 9G illustrates an example of RD-cost accumulation for the last column of CGs (i.e., col7). Among the eight kinds of sum of RD-cost (961-968) for the col7 CGs, the first kind of RD-cost is calculated and accumulated with the previous RD-cost at previous group location 8. After the last column of CGs has been processed, the last significant CG position is known and the total RD-cost of the TB is also known.

As shown in the above example, the computations and storages required for determining the last significant CG position and the associated RD-cost according to the present invention are much lower than the convention approach as disclosed in the existing VTM.

In the example shown in FIG. 9A, there exist multiple non-zero CGs (i.e., CGs 7, 8, 15, 32, 51, 55, 56, and 58-63) in the TB indicated by dots-filled squares. According to one embodiment of the present invention, a non-zero CG is selected as the last significant coefficient region. In the case of multiple non-zero CGs, the last significant coefficient region is selected as the very first non-zero CG according to a scanning order from the highest frequency to the lowest frequency.

In another aspect of the present invention, a simplified SDH method is disclosed for the system incorporating RDOQ. As mentioned earlier, when RDOQ is use, a transform coefficient is directly quantized to level $l^{ceil}$. The directly quantized transform coefficient is adjusted to an optimized level or a best level ($l^{best}$). The best level ($l^{best}$) is determined based on RD-cost according to equations (1)-(4). When SDH is used with RDOQ, the SDH is processed according to equations (5)-(6) as described earlier.

According to the present invention, the best level ($l^{best}$) determination in equation (3) is modified to:

$$\text{If } l^{ceil}=2, \text{ best level=1 or 2.} \tag{3a}$$

With the modified equation (3), The best level ($l^{best}$) is determined as the following equations equivalently:

$$\text{If } l^{ceil}=0, \text{ best level=0} \tag{7}$$

$$\text{Otherwise, best level=}l^{ceil} \text{ or } l^{ceil}-1 \tag{8}$$

The SDH process is simplified according to the present invention as shown in equations (9)-(10):

$$\text{If } l^{best}=l^{ceil}, \text{ test } l^{ceil}-1; \text{ otherwise, test } l^{ceil} \tag{9}$$

$$\text{Test } l^{best}+1, \text{ if } l^{best}=0 \tag{10}$$

The best level determination according to the present invention as shown in equations (7)-(8) and the SDH process according to the present invention as shown in equations (9)-(10) are well aligned so that SDH testing candidates are a subset of RDOQ best level testing candidates. Therefore, the required operations are reduced. For example, if $l^{ceil}=2$, best level=2 or 1 (chosen according to RD-cost based on equation (8)). Therefore, if best level=1, then SDH will select 2 if it needs to modify coefficient; and if best level=2, then SDH will select 1 if it needs to modify coefficient. In another example, if $l^{ceil}=5$, best level=5 or 4 (chosen according to RD-cost based on equation (8)). Therefore, if best level=4, then SDH will select 5 if it needs to modify coefficient; and if best level=5, then SDH will select 4 if it needs to modify coefficient. In yet another example, if $l^{ceil}=1$, best level=1 or 0 (chosen according to RD-cost based on equation (8)). Therefore, if best level=0, then SDH will select 1 if it needs to modify coefficient; and if best level=1, then SDH will select 0 if it needs to modify coefficient.

As shown in the above example, when SDH is used with RDOQ, the SDH process according to the present invention becomes much simpler.

Figure 10:
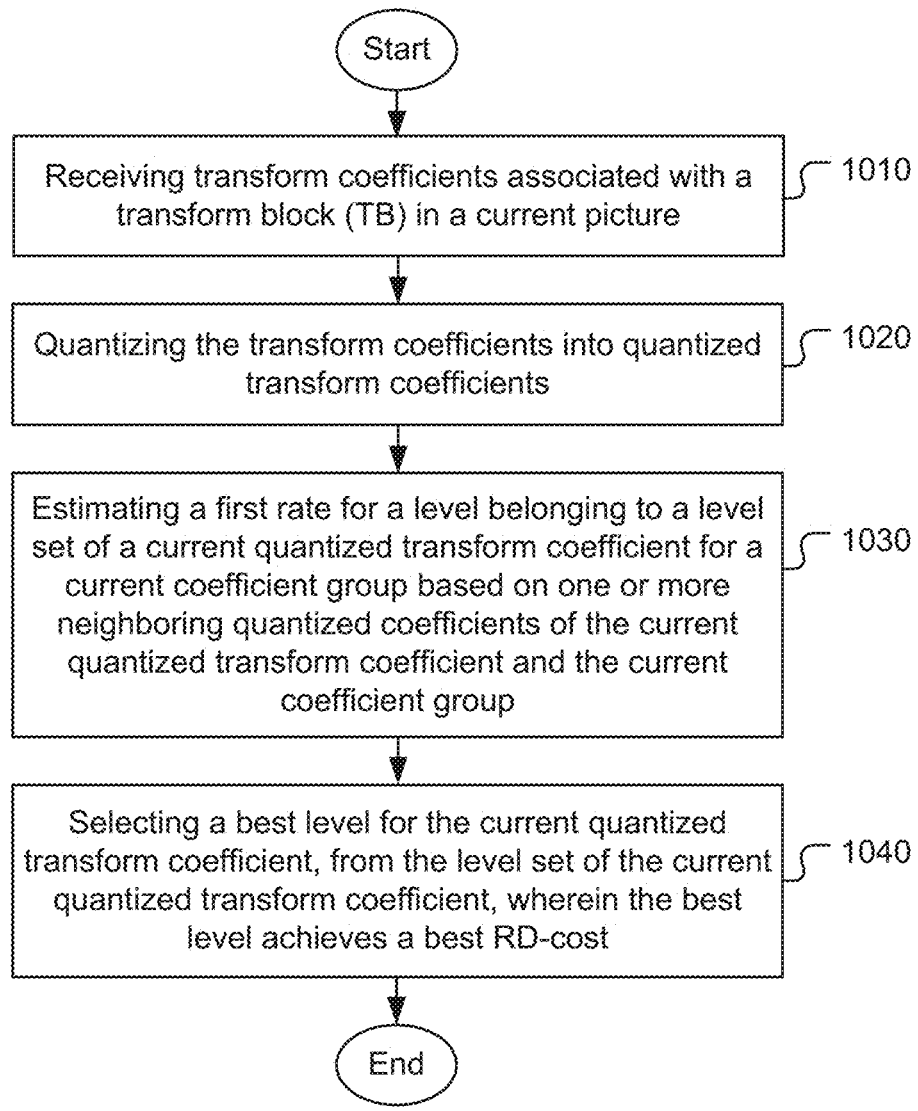
FIG. 10 illustrates a flowchart of an exemplary video coding system incorporating RDOQ (Rate Distortion Optimized Quantization) according to an embodiment of the present invention, where the data dependency associated with rate estimation of a target coefficient is removed.

FIG. 10 illustrates a flowchart of an exemplary video coding system incorporating RDOQ (Rate Distortion Optimized Quantization) according to an embodiment of the present invention, where the data dependency associated with rate estimation of a target coefficient is removed. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, transform coefficients associated with a transform block (TB) in a current picture are received in step 1010. The transform coefficients are quantized into quantized transform coefficients in step 1020. A first rate for a level belonging to a level set of a current quantized transform coefficient is estimated for a current coefficient group based on one or more neighboring quantized coefficients of the current quantized transform coefficient and the current coefficient group in step 1030. A best level is selected for the current quantized transform coefficient, from the level set of the current quantized transform coefficient in step 1040, wherein the best level achieves a best RD-cost.

Figure 11:
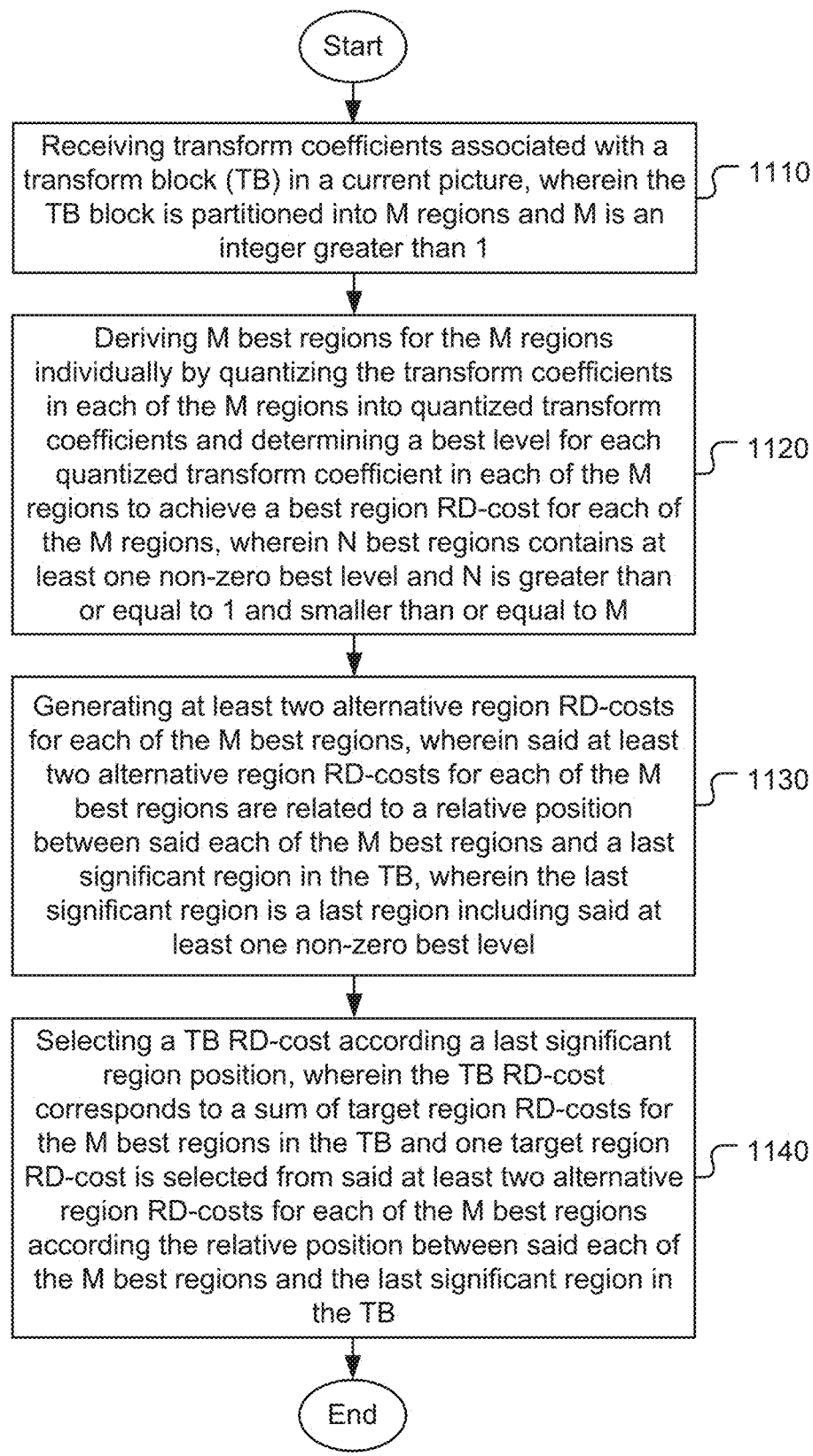
FIG. 11 illustrates a flowchart of an exemplary video coding system incorporating RDOQ (Rate Distortion Optimized Quantization) according to an embodiment of the present invention, where the RD-cost calculation is simplified.

FIG. 11 illustrates a flowchart of an exemplary video coding system incorporating RDOQ (Rate Distortion Optimized Quantization) according to an embodiment of the present invention, where the RD-cost calculation is simplified. According to this method, transform coefficients associated with a transform block (TB) in a current picture are received in step 1110, wherein the TB block is partitioned into M regions and M is an integer greater than 1. M best regions are derived for the M regions individually in step 1120 by quantizing the transform coefficients in each of the M regions into quantized transform coefficients and determining a best level for each quantized transform coefficient in each of the M regions to achieve a best region RD-cost for each of the M regions, wherein N best regions contains at least one non-zero best level and N is greater than or equal to 1 and smaller than or equal to M. At least two alternative region RD-costs are generated for each of the M best regions in step 1130, wherein said at least two alternative region RD-costs for each of the M best regions are related to a relative position between said each of the M best regions and a last significant region in the TB, wherein the last significant region is a last region including said at least one non-zero best level. A TB RD-cost is selected according a last significant region position in step 1140, wherein the TB RD-cost corresponds to a sum of target region RD-costs for the M best regions in the TB and one target region RD-cost is selected from said at least two alternative region RD-costs for each of the M best regions according the relative position between said each of the M best regions and the last significant region in the TB.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
    receiving transform coefficients associated with a transform block (TB) in a current picture;
    quantizing the transform coefficients into quantized transform coefficients;
    estimating a first rate for a level belonging to a level set of a current quantized transform coefficient for a current coefficient group based on one or more neighboring quantized coefficients of the current quantized transform coefficient and the current coefficient group, wherein the one or more neighboring quantized coefficients is one or more directly quantized coefficients; and
    selecting a best level for the current quantized transform coefficient, from the level set of the current quantized transform coefficient, wherein the best level achieves a best RD-cost.

2. The method of claim 1, further comprises estimating a second rate for a syntax associated with zero or non-zero coefficient group based on said one or more neighboring quantized coefficients of the current quantized transform coefficient and the current coefficient group.

3. The method of claim 1, wherein the level set of the current quantized transform coefficient consists of 0 if the current quantized transform coefficient is equal to 0; the level set of the current quantized transform coefficient consists of 0 and 1 if the current quantized transform coefficient is equal to 1; the level set of the current quantized transform coefficient consists of 0, 1 and 2 if the current quantized transform coefficient is equal to 2; and the level set of the current quantized transform coefficient consists of the current quantized transform coefficient and (the current quantized transform coefficient-1) if the current quantized transform coefficient is greater than 2.

4. The method of claim 1, wherein the level set of the current quantized transform coefficient consists of 0 if the current quantized transform coefficient is equal to 0; and the level set of the current quantized transform coefficient consists of the current quantized transform coefficient and (the current quantized transform coefficient-1) if the current quantized transform coefficient is greater than 0.

5. The method of claim 1, wherein said one or more neighboring quantized coefficients of the current quantized transform coefficient consist of two right-side neighboring quantized coefficients, one lower-right neighboring quantized coefficient and two bottom-side neighboring quantized coefficients.

6. The method of claim 1, wherein said one or more neighboring quantized coefficients of the current coefficient group consist of the quantized coefficients in a right-side neighboring coefficient group, and the quantized coefficients in a bottom-side neighboring coefficient group.

7. The method of claim 6, further comprising estimating a third rate for a current coefficient-group significant flag based on said one or more neighboring quantized coefficients of the neighboring coefficient group.

8. The method of claim 1, wherein summation of said one or more neighboring quantized coefficients and a number of non-zero quantized coefficients of said one or more neighboring quantized coefficients are used to estimate the first rate for the level belonging to the level set of the current quantized transform coefficient.

9. The method of claim 1, wherein when sign data hiding (SDH) is used to save one bit for sign data of the transform coefficients in one coefficient group of the TB and a parity of a sum of best levels in one coefficient group fails to satisfy SDH assumption, SDH process checks all levels in the level set of a target quantized transform coefficient except for the level equal to best level.

10. The method of claim 9, wherein for each best level selected for the target quantized transform coefficient being greater than 1, the SDH process checks the target quantized transform coefficient for sign hiding if the best level is equal to (the target quantized transform coefficient-1) and the SDH process checks (the target quantized transform coefficient-1) if the best level is equal to the target quantized transform coefficient.

11. An apparatus of video coding, the apparatus comprising one or more electronic circuits or processors arranged to:
receive transform coefficients associated with a transform block (TB) in a current picture;
quantize the transform coefficients into quantized transform coefficients:
estimate a first rate for a level belonging to a level set of a current quantized transform coefficient for a current coefficient group based on one or more neighboring quantized coefficients of the current quantized transform coefficient and the current coefficient group, wherein the one or more neighboring quantized coefficients is one or more directly quantized coefficients; and
select a best level for the current quantized transform coefficient, from the level set of the current quantized transform coefficient, wherein the best level achieves a best RD-cost.

* * * * *